Feb. 5, 1935.   C. E. H. ARMBRUSTER   1,990,107
MACULAR REFLECTOSCOPE
Filed March 6, 1933   3 Sheets-Sheet 1
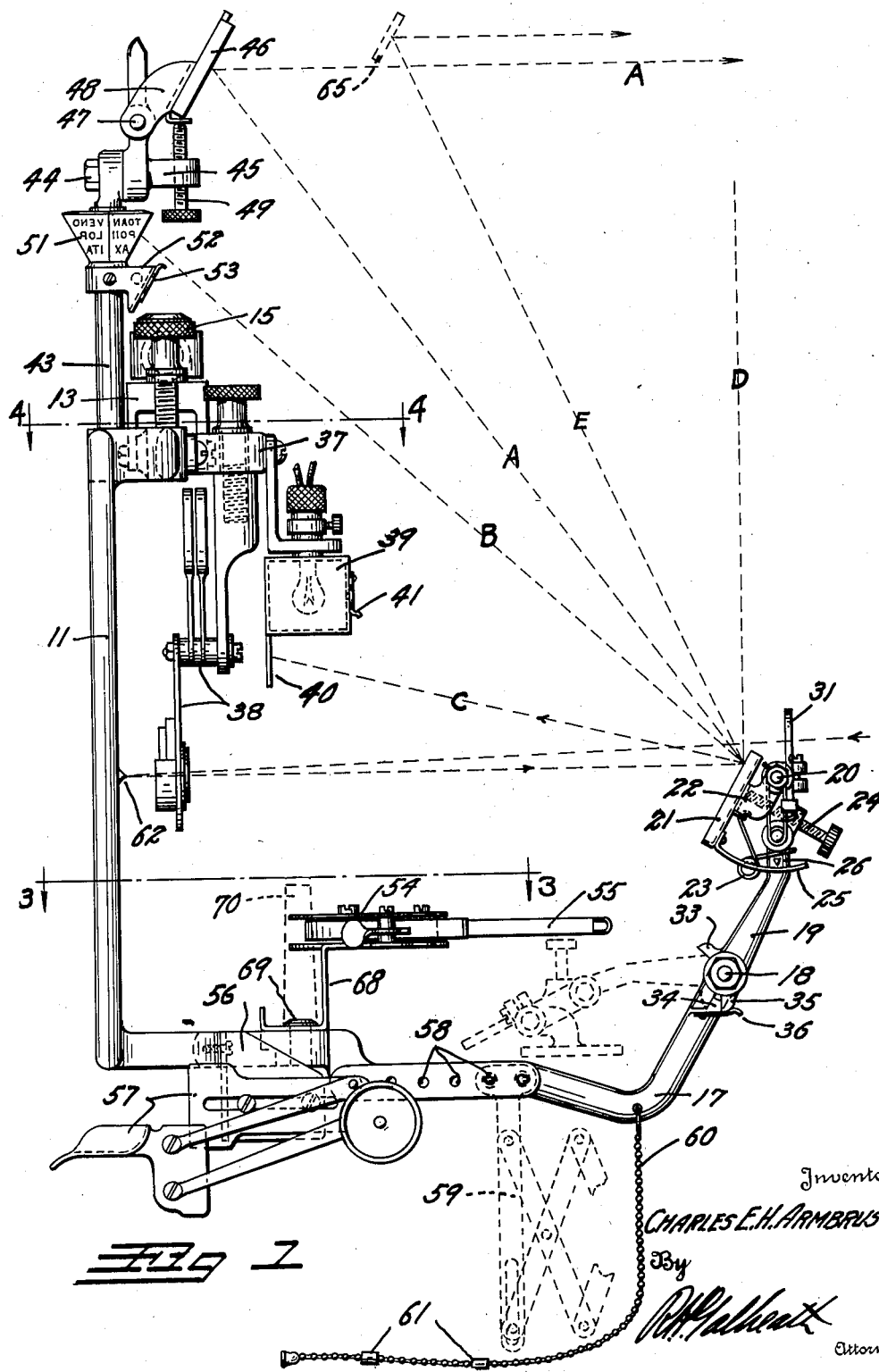
Inventor
CHARLES E.H.ARMBRUSTER

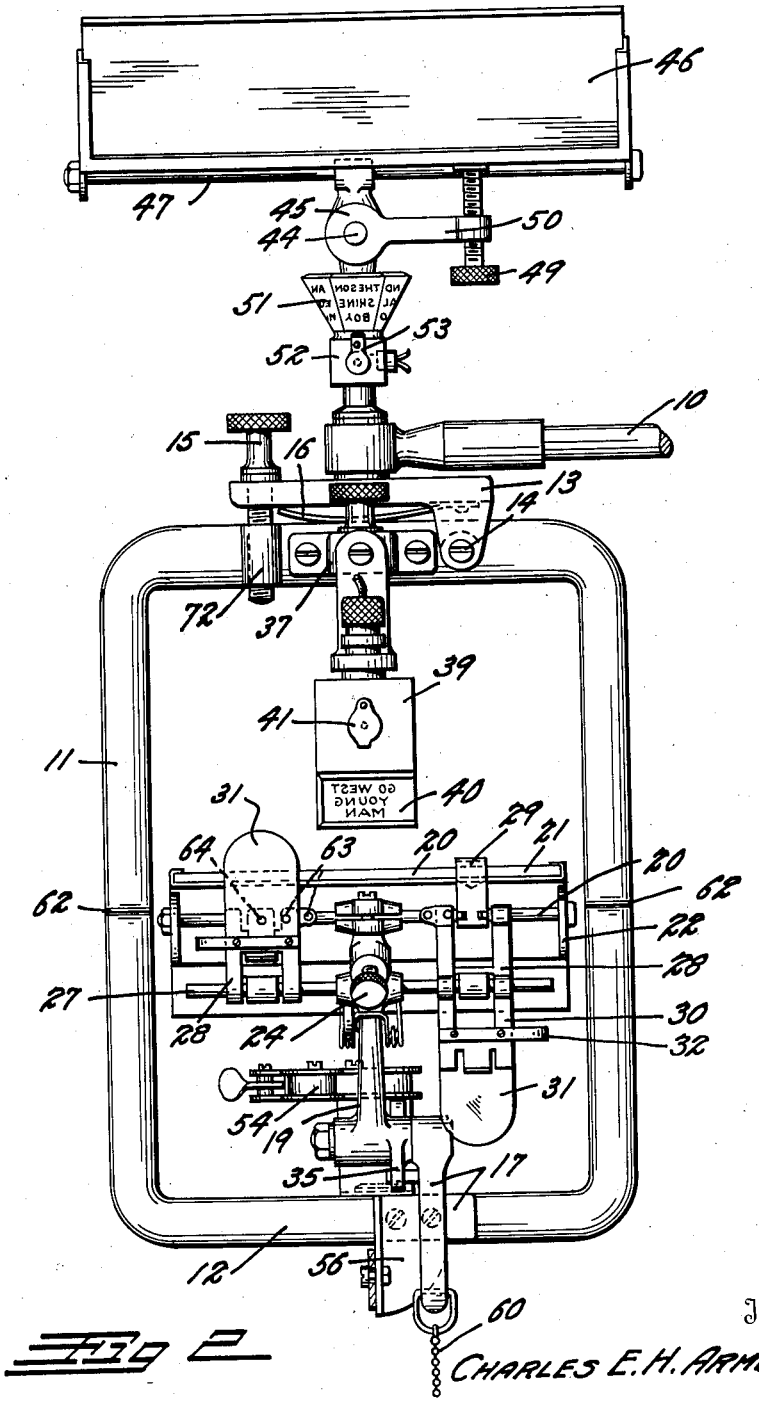

Feb. 5, 1935.  C. E. H. ARMBRUSTER  1,990,107
MACULAR REFLECTOSCOPE
Filed March 6, 1933   3 Sheets-Sheet 3
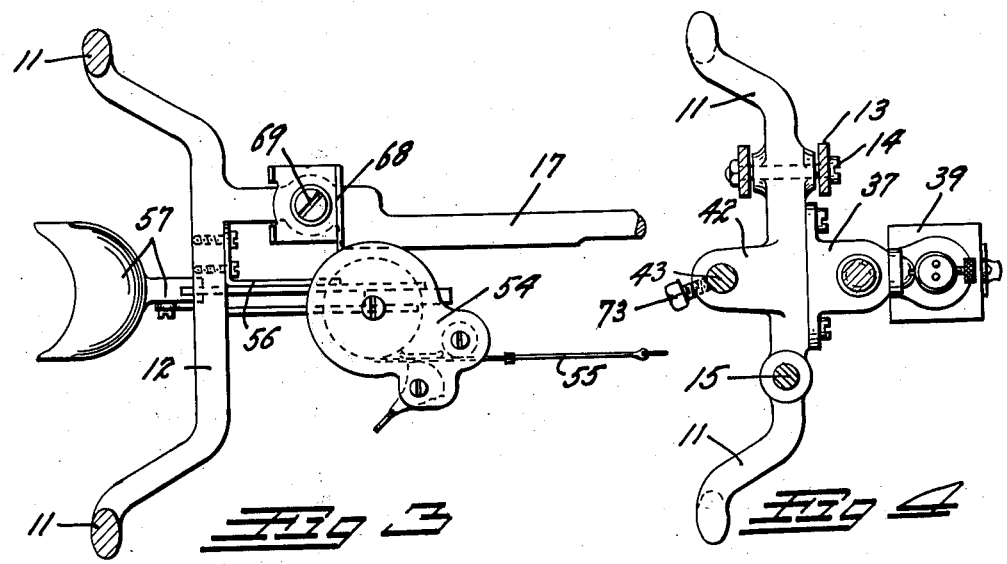
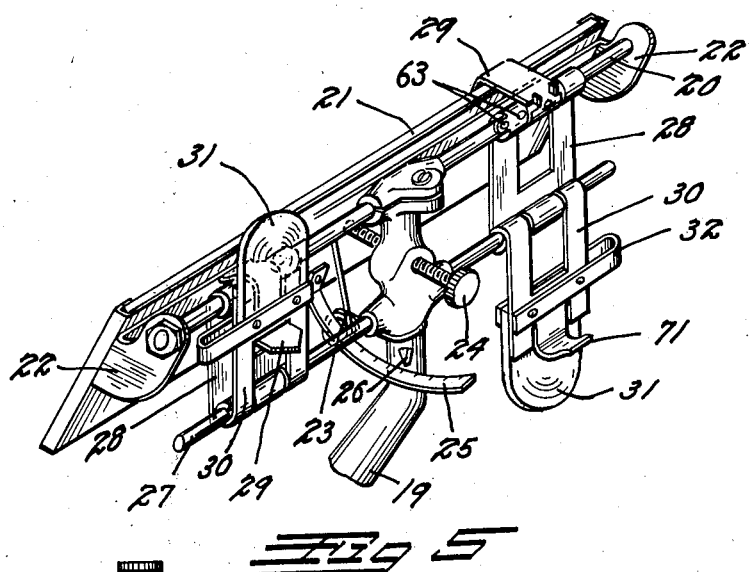
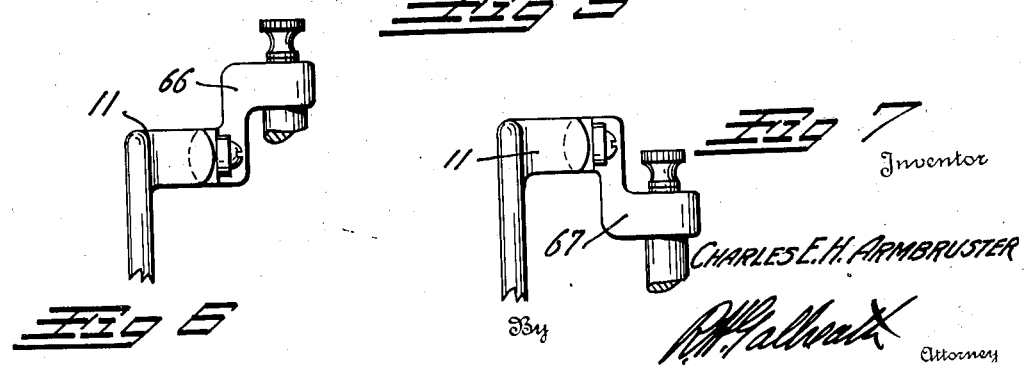
Inventor
CHARLES E. H. ARMBRUSTER
By
Attorney Patented Feb. 5, 1935

1,990,107

UNITED STATES PATENT OFFICE 1,990,107

MACULAR REFLECTOSCOPE

Charles E. H. Armbruster, Denver, Colo.

Application March 6, 1933, Serial No. 659,764

17 Claims. (Cl. 88—20)

This invention relates to an improved macular reflectoscope of the type illustrated and described in my U. S. Letters Patents Nos. 1,190,619; 1,469,411; 1,651,661; and 1,657,601. The reflectoscope is designed for use by refractionists in retinoscopic measuring of the refractions of the eye, and prescribing lenses therefor.

The customary practice in static retinoscopy is to request the patient to look at a distant fixation object over or to the side of the operator's head while the operator measures the eye with the retinoscope. This produces an angle astigmatism that the eye under examination does not possess. The reflectoscope, however, employs mirrors for offsetting the patient's line of vision about the operator to avoid this angle astigmatism and it is to such a reflectoscope that the present invention is directed.

The principal object of the invention is to incorporate the principal features of all the above patents and improvements thereon, in a single flexible and efficient unit.

Another object of the invention is to provide means for efficiently supporting the various elements of the device from a single frame member which will itself be supported from above the head of the patient so as to eliminate any structure below the optometer which might interfere with either the patient or the operator.

Another object of the invention is to combine in a single efficient unit, all the elements necessary for both dynamic and static measurements.

A further object of the invention is to provide a macular reflectoscope in which a variety of different fixation objects as a variety of different distances can be quickly and easily placed in the line of the patient's vision and in which the operator will be informed at all times as to which of the various objects are being fixated by the patient.

Refractionists in measuring the static refractions of the human eye by means of a retinoscope employ, in addition to the corrective lenses for their patient, what are known as "working lenses". These are convex lenses which refract the reflected retinoscopic light from the retina into the operator's eye at an angle which will correct for the difference in distance between the operator's working position and the fixation object. These working lenses have a focal length to coincide with the distance at which the operator positions his retinoscope and are usually placed in the trial frames before the patient's eyes. The patient must of course look through these working lenses and obtains a blurred or indistinct image of the fixation object until the working lenses are removed. This blurring is supposed to relax the accommodation and bring out latent errors. In many cases this is true, and the correction found can be prescribed. But when the eye is suffering from spasm of the accommodation from too much near work or other causes, the accommodation does not relax under the influence of a convex lens, but actually maintains its spasm, because of the lack of clear vision, the incentive for clear vision being lost.

A still further object of the present invention is to provide a method and means for carrying out the method which will enable the refractionist to receive the retinal reflex through the working lenses without requiring the patient to look through the working lenses at the fixation object.

There are upon the market a wide variety of trial frames for positioning various trial lenses before the patient's eyes. Some of these frames are supported on pedestals from below the eyes, others are suspended from brackets above the eyes. The pedestals and brackets of various makes are of various lengths and designs. A further object of this invention is to provide a reflectoscope frame which will adapt itself to any trial frame the operator desires to use.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the improved macular reflectoscope with the lines of sight diagrammatically shown thereon.

Fig. 2 is a front view thereof looking from the operator's position.

Fig. 3 is a horizontal detail section through the face frame taken on the line 3—3, Fig. 1.

Fig. 4 is a similar section taken on the line 4—4, Fig. 1.

Fig. 5 is a detail perspective view of the lower mirror assembly.

Fig. 6 is a detail view of an alternate form of the trial frame bracket.

Fig. 7 is a similar view of a second alternate form of the trial frame bracket.

The entire device is designed to be supported from a horizontal bracket rod 10 which can extend from a wall bracket; a floor standard; a table standard; a ceiling bracket or any other desired supporting structure. All of the reflectoscope mechanism is carried from a single face frame 11 which extends over and downwardly on each side of the patient's face and is connected at its lower extremity by a horizontal bridge member 12. The bridge member 12 is indented forwardly as shown in Fig. 3 to allow clearance for the patient's chin.

The face frame 11 is supported directly from the bracket rod 10 by means of a leveling bracket 13. The bracket 13 is hinged at its one extremity, at 14, to the frame 11 to one side of the vertical center line thereof. The other extremity of the bracket 13 extends beyond the vertical center line and is bifurcated to pass under the head of a leveling screw 15. The screw 15 is threaded into a suitable boss 72 on the face frame 11. A leaf spring 16 constantly urges the frame 11 away from the bracket 13 so as to constantly maintain the head of the leveling screw against the bracket. With this arrangement, the frame 11 can be leveled regardless of the trueness of the arm 10. For instance if the screw 15 be loosened, the lower portion of the frame will be swung to the right, if the screw be tightened it will be swung to the left.

A lower mirror arm 17 extends forwardly from the bridge member 12 of the frame 11 terminating at a hinge bolt 18. A lower mirror bracket 19 is hinged upon the hinge bolt 18 and supports at its upper extremity, a horizontal mirror rod 20. A mirror, which will be herein designated as the lower mirror 21, is hinged by means of suitable frame provided with ears 22 through which the mirror rod 20 passes.

The angle of the lower mirror 21 can be adjusted by means of a left-hand threaded, adjusting screw 24, the extremity of which bears against the frame of the mirror 21. A tension spring 23 constantly holds the frame of the mirror 21 against the adjustment screw 24. Thus, when the screw 24 is screwed inwardly, it will swing the mirror 21 inwardly and upwardly.

The angular position of the mirror can be read by the operator on a suitable protractor 25 which projects rearwardly from the mirror 21 and co-acts with a stationary indicating point 26.

A lens frame shaft 27 is also supported by the mirror arm 19 below the mirror rod 20 and in parallel relation thereto. A small target frame 28 is slidably mounted upon the mirror rod 20 and the clip shaft 27 at each side of the mirror arm 19. In the upper extremity of each target frame 28 is a hinged pointer or vision finding target 29 which can be swung upwardly so as to extend over the upper portion of the surface of the mirror 21 or can be thrown rearwardly to a pendant position, as indicated on the left target of Figs. 2 and 5.

At the lower extremity of each target frame 28, and hinged upon the clip rod 27, is a lens frame 30, to each of which a lens 31 is secured by means of bowed clamp member 32 and suitable attachment screws. The lenses 31 can be swung upwardly to the working position (see left lens of Fig. 2) or downwardly to the pendant position (see right lens Fig. 2) when desired. The clamp members 32 may, if desired, be projected beyond the lenses 31, as illustrated, to form a finger hold for swinging the lenses. A curved clip 71 on the lens frame snaps over the mirror rod 20 to maintain the lens frame upright. The lenses 31 are termed "working lenses" and their use will be later described.

The mirror bracket 19 with its entire supported structure can be swung forwardly to the broken line position of Fig. 1 when not in use. The amount of forward movement is limited by a stop 33, which engages a lug 34 on the arm 17. The amount of rearward movement is limited by a similar stop 35 which also engages the lug 34. A click spring 36 acts to engage the stop 35 and hold the mirror structure in the erected position until it is desired to fold the latter.

A trial frame boss 37 is secured to the upper portion of the face frame 11 and supports a trial frame 38 of any of the standard varieties for receiving interchangeable trial lenses. The trial frame 38, per se, forms no part of the present invention and may be any of the usual trial frames at present on the market. The trial frame boss 37 may also support a lamp box 39 containing an electric lamp so positioned as to illuminate a small reading chart 40. The front of the light box 37 may be provided with a pin-hole aperture, provided with a slide 41, for use in the Maddox rod test.

Extending rearwardly from the trial frame boss 37 is a similar boss 42. A vertical standard 43 extends upwardly from the boss 42. The standard 43 may be adjusted to any desired position and locked in the adjusted position by means of a set screw 73. The standard 43 terminates in an attachment screw 44 by means of which an upper mirror frame 45 is adjustably secured to the top of the standard. The upper mirror frame hingedly supports an upper mirror 46 on a horizontal hinge rod 47. The mirror 46 is provided with a suitable frame and is projected forwardly from the hinge rod 47 upon ears 48. An adjusting screw 49 is threaded upwardly through an arm 50 on the mirror bracket to support the upper mirror at any desired angle. This screw is also preferably left handed so that when turned to the left it will move upwardly and swing the mirror 46 upwardly and rearwardly. The arm 50 positions the screw 49 to one side so that the operator need not place his hand in the line of vision.

A frusto-conical, rotary reading chart 51 is mounted on the standard 43 and illuminated by means of a lamp in a suitable lamp box 52, which may also be provided with a pin hole and slide 53 for the Maddox rod test. The chart 51 may be rotated to expose any of its face which may contain words or pictures of various sizes.

A measuring tape attachment 54 may be secured upon the lower mirror arm 17, as illustrated in Fig. 1, by means of an attachment bracket 68 and screw 69. This tape is for measuring the distance between the patient's eye and the focus or fixation point in dynamic tests. The detail construction of the tape is illustrated in applicant's prior Patent No. 1,657,601 and need not be detailed here. The present tape differs from the prior tape only in that it has an unindexed extremity 55 which does not bear the dioptric index of the remainder of the tape. The use of this blank extremity will be later described.

An adjustable chin rest bracket 56 may be secured to the front of the bridge member 12 of the face frame 11 for supporting a chin rest attachment 57. This chin rest attachment is described in detail in applicant's Patent No. 1,651,661 and need not be detailed here.

A series of holes 58 are provided in the lower mirror arm 17 for supporting a lazy tongs support 59 which is used to support a dynamic phoroptometer mechanism. The lazy tongs and the phoroptometer mechanism which it supports are described in detail in applicant's Patent No. 1,-657,601 and need not be detailed here.

An operator's positioning chain 60 is secured to the lower mirror bracket 17. This chain is provided with suitable permanent markers 61 by means of which the operator may quickly position his eye at the proper focal distance from the working lenses 31.

Operation

In operation the face frame 11 is placed before the patient who positions his chin in the chin rest 57. The chin rest is adjusted to bring the patient's eyes to the proper position for the trial frames. To facilitate this operation, eye aligning points 62 are formed on the face frame 11 in alignment with the proper pupil position for the patient.

Let us assume that a static examination is to be made and that the operating room has a chart on its distant wall. The operator now asks the patient to look into the mirror 21 and adjusts the upper mirror 46 until the patient sees the chart as reflected from the mirror 46 into the mirror 21. The screw 24 is now adjusted until the patient sees the fixation portion of the chart at the upper edge of the mirror 21.

One of the patient's eyes is now shielded and the vision finder 29 on the other side is moved until its point is over the reflected image of the fixation object of the unshielded eye. This point is found by questioning the patient. This is repeated with the other eye to position the frames 28 on the lines of sight of the patient's eyes when the latter are fixed upon the distant fixation object.

The operator now swings the vision finders 29 downwardly out of action and swings the working lenses 31 upwardly to the working position. Each of the frames 28 is provided with one or more sights or target spots 63 and the vision finders 29 are each provided with a target spot 64. The latter target spots are used for distant fixation, the former for close or dynamic fixations.

The operator now places his eye at the exact focal point of the working lens 31. He can maintain this exact position by gripping the chain 60 at the proper indicator 61 or he may employ the tape 54 if he desires. He then proceeds with the usual refracting examination by means of the retinoscope. With the present reflectoscope, however, he will project his retinoscopic light through the working lens 31 into the eye of the patient and will receive his return light through this working lens. The patient, however, will not look through the lenses 31 but will see his fixation object through the trial frame lenses and the mirrors 21 and 46, as indicated by the line "A" on Fig. 1.

The working lenses act to converge the reflected rays from the patient's eyes to a focus in the operator's eye similar to the effect the latter would obtain if positioned at the distant fixation point. The examination is continued and trial lenses are inserted in the trial frame. When the proper lenses have been found and no movement of return light is noted, the patient will see the fixation object in the best possible focus without the fogging blurrng effect caused by the usual position of the working lenses. The above is obtained by positioning the working lenses out of the patient's line of fixation. This could be accomplished with other types of lens holders and without the remainder of macular reflectoscope, and although the latter provides a very convenient and efficient means for carrying out the method, it is to be understood that the method is not limited thereto.

Where the operator makes use of the working lenses attached to the lower mirror, different fixation objects at different distances can be presented to the patient's eyes, and the amount of accommodation brought into play by the patient's eyes can be read on the tape line as the operator draws to the point of no motion.

The same principle can be used when operator looks over the top of sight on the lower mirror, when working lenses are thrown out of the working position. The tape line must, however, be so constructed that two different readings can be taken. This is done by adding the blank tape 55 to the regular measuring tape, equaling the distance from the working lens to the trial frame.

When the working lens is not in use the tape is grasped at the regular graduated tape ending, as is done in regular static and dynamic retinoscopy.

For a medium close dynamic test (say one-half meter) the screw 24 may be rotated to the proper indication on the protractor 25 to make the reading chart 51 visible to the patient along the line "B" of Fig. 1.

For a still closer dynamic test (say one-third meter), the screw 24 may be rotated to the proper indication on the protractor 25 to make the close reading chart 40 visible to the patient along the line "C" of Fig. 1. The Maddox rod test can be conducted from either of the light boxes 39 or 52.

The lower mirror 21 can also be adjusted by means of the screw 24 to make a ceiling chart visible (at say three meters) to the patient along the line "D"; Fig. 1. An overhead ceiling mirror, such as indicated at 65 can be used with a distant fixation object and the lower mirror is adjusted to bring the line of sight to his patient along the line "E" of Fig. 1.

Thus the operator is enabled to quickly place different fixation objects, situated at different distances in the patient's line of vision and he is informed at all times of the particular fixation object visible to the patient by the indications of the protractor 25.

The non-fogging working lenses can be used in testing the patient's eyes with the retinoscope at the different distances up to and including one meter, after which the operator turns the working lenses out of the working position, and makes his measurements with the retinoscope, over the sights on the lower mirror, while patient is viewing chart reflected in the lower mirror. In the latter case the operator's eye is stationed about an equal distance behind the lower mirror, as the fixation chart is located in front of it.

For various types of trial frames, various types of adaptors may be employed in place of the trial frame box 37, such as the upwardly extending adaptor 66 of Fig. 6 or the downwardly extending adaptor 67 of Fig. 7. If it is desired to use the older style trial frames which are supported from below, the attachment screw 69 may be removed from the tape attachment bracket 68 and the regular spindle of the trial frame can be secured in the screw hole to hold the tape attachment in place, as indicated in broken line at 70, Fig. 1.

By interposing a bracket containing a leveling device between bracket and phoroptor heads that are now on the market, providing sockets to receive phoroptors hung from above as well as those having spindles from below, and by providing adapters to accommodate other phoroptors, it is possible to have an improved macular reflectoscope that will receive any and all refractors now in use, as well as serving those that use the old face trial frame.

The most important distances to be used in eye testing are six meters (static retinoscopy), one-half and one-third meters (dynamic retinoscopy). The white sight 64 on the back of the target 29, which shows when it is returned to the back of mirror, is used for locating the patient's line of vision at six meters (static retinoscopy). For dynamic retinoscopy the operator looks over the top of the lower mirror on the lines of sights 63. This avoids resetting the targets at each of these distances and locates the patient's line of vision when eyes are converging to fix upon the nearer test charts. The working lenses in the latter case are thrown out of their working position.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In a macular reflectoscope: a lower mirror bracket member; a mirror rod horizontally supported by said bracket member; a mirror hingedly supported on said mirror rod; a target member slidably and rotatably supported on said mirror rod so that it may be swung over the upper portion of said mirror to locate the patient's fixation line thereon; a working lens support engaging said target so as to move in consequence of the sliding of said target member; and a working lens carried by said working lens support.

2. In a macular reflectoscope: a lower mirror bracket member; a mirror rod horizontally supported by said bracket member; a mirror hingedly supported on said mirror rod; a target member slidably and rotatably supported on said mirror rod so that it may be swung over the upper portion of said mirror to locate the patient's fixation line therein; a shaft member positioned below and extending parallel to said mirror rod; a frame member slidably mounted upon and extending between said shaft member and said mirror rod; a lens support hingedly carried by said frame member; and a working lens carried by said lens support so that it will move with said target member and so that it may be swung upwardly to project above said mirror.

3. In a macular reflectoscope: a lower mirror bracket member; a mirror rod horizontally supported by said bracket member; a mirror frame supported on said mirror rod and carrying a mirror; a target member slidably and rotatably supported on said mirror rod so that it may be swung over the upper portion of said mirror to locate the patient's fixation line therein; and an adjusting screw threaded through said bracket member so as to contact with said mirror and swing it about said mirror rod; and an arcuate scale projecting from said mirror frame so as to indicate the angle to which said mirror is swung.

4. In a macular reflectoscope, a face frame comprising: two vertical members adapted to pass on each side of the patient's face; a lower bridge member connecting said vertical members; an upper bridge member connecting said vertical members; means for supporting a lower mirror from said lower bridge member; means on said upper bridge member for supporting said face frame; and an upper mirror supported from said upper bridge member.

5. In a macular reflectoscope, a face frame comprising: two vertical members adapted to pass on each side of the patient's face; a lower bridge member connecting said vertical members; an upper bridge member connecting said vertical members; means for supporting a lower mirror from said lower bridge member; a supporting member for said face frame; means for attaching said upper bridge member to an exterior support; and means for adjusting the relative position of said face frame to said supporting member.

6. In a macular reflectoscope, a face frame comprising: two vertical members adapted to pass on each side of the patient's face; a lower bridge member connecting said vertical members; an upper bridge member connecting said vertical members; means for supporting a lower mirror from said lower bridge member; means on said upper bridge member for supporting said face frame; a standard extending upwardly from said upper bridge member; an upper mirror adjustably supported by said standard; and a dynamic chart supported by said standard.

7. In a macular reflectoscope, a face frame comprising: two vertical members adapted to pass on each side of the patient's face; a lower bridge member connecting said vertical members; an upper bridge member connecting said vertical members; means for supporting a lower mirror from said lower bridge member; means on said upper bridge member for supporting said face frame; a standard extending upwardly from said upper bridge member; an upper mirror adjustably supported by said standard; a dynamic chart supported by said standard above said upper bridge member; and a second dynamic chart supported below said upper bridge member.

8. In a macular reflectoscope having a mirror for reflecting the fixation object to the patient's eye: a lens support hinged at the back of said mirror; and a working lens carried by said lens support so that it may be swung upwardly in an arc parallel to the line of sight so as to project above said mirror when in use and downwardly to the rear of said mirror when not in use.

9. In a macular reflectoscope having a mirror for reflecting the fixation object to the patient's eye: a lens support mounted for both pivotal and sliding movement at the back of said mirror; and a working lens carried by said lens support so that it may be swung upwardly to project above said mirror when desired, said lens support being horizontally movable so that the horizontal position of said lens may be varied to align same with the line of sight.

10. In a macular reflectoscope having a mirror for reflecting the fixation object into the eye of a patient and a horizontally movable target for locating the line of fixation of said patient: a lens support mounted for both pivotal and horizontal movement and connected with said target; and a lens carried by said support so that it may be swung above said mirror, and so that it will move horizontally in consequence of the movement of said target.

11. In a macular reflectoscope a supporting bracket; a first horizontal rod supported by said supporting bracket; a second horizontal rod in parallel relation to said first rod; a mirror pivotally supported on said first rod; means for setting said mirror at any desired angle; a target frame extending between said rods and slidably mounted thereon; a target member rotatably mounted at the upper extremity of said target frame so that it may be swung over the upper edge of said mirror; a lens frame hingedly secured at the lower extremity of said target frame; a working lens carried by said lens frame so that it may be swung upwardly to project above said mirror; and means for holding said lens frame in its upward position.

12. In a macular reflectoscope a supporting bracket; a first horizontal rod supported by said supporting bracket; a second horizontal rod in parallel relation to said first rod; a mirror pivotally supported on said first rod; means for setting said mirror at any desired angle; a target frame extending between said rods and slidably mounted thereon; a target member rotatably mounted at the upper extremity of said target frame so that it may be swung over the upper edge of said mirror; a lens frame hingedly secured at the lower extremity of said target frame; a working lens carried by said lens frame so that it may be swung upwardly to project above said mirror; means for holding said lens frame in its upward position, said target frame being bifurcated at its upper extremity so as to extend on each side of said target member; and said lens frame being also bifurcated so as to extend on each side of said target frame so that the entire assembly may be moved horizontally as a unit.

13. In a macular reflectoscope: a horizontal supporting arm; a face frame shaped to enclose the face of a patient; a bracket member secured to said supporting arm, one extremity of said bracket member being pivoted to said face frame; and an adjusting screw securing the other extremity of said bracket to said face frame so that the latter may be brought to a level position.

14. In a macular reflectoscope: a horizontal supporting arm; a face frame shaped to enclose the face of a patient; a bracket member secured to said supporting arm, one extremity of said bracket member being pivoted to said face frame; an adjusting screw securing the other extremity of said bracket to said face frame so that the latter may be brought to a level position; and a spring constantly urging said face frame away from said bracket member.

15. In a macular reflectoscope: a horizontal supporting arm; a face frame arranged to surround the face of a patient, said face frame being adjustably suspended below said arm; an adaptor extending forwardly from the upper portion of said face frame; a trial frame suspended from said adaptor and extending downwardly within said face frame; and a boss extending oppositely outward from said adaptor; a post extending upwardly from said boss; and a mirror adjustably supported on said post.

16. In a macular reflectoscope: a horizontal supporting arm; a face frame arranged to surround the face of a patient, said face frame being adjustably suspended below said arm; an adaptor extending forwardly from the upper portion of said face frame; a trial frame suspended from said adaptor and extending downwardly within said face frame; a boss extending oppositely outward from said adaptor; a post extending upwardly from said boss; a mirror adjustably supported on said post; and a rotatable series of reading charts surrounding said post, said charts being inclined outwardly so as to form an inverted pyramidal shape.

17. In a macular reflectoscope: a horizontal supporting arm; a face frame arranged to surround the face of a patient, said face frame being adjustably suspended below said arm; an adaptor extending forwardly from the upper portion of said face frame; a trial frame suspended from said adaptor and extending downwardly within said face frame; a boss extending oppositely outward from said adaptor; a post extending upwardly from said boss; a mirror adjustably supported on said post; a rotatable series of reading charts surrounding said post, said charts being inclined outwardly so as to form an inverted pyramidal shape; and a light positioned immediately below said charts to illuminate the same, said light being an aperture so that it will be visible to a patient using said reflectoscope.

CHARLES E. H. ARMBRUSTER.